US008392407B2

(12) United States Patent  
Huang et al.

(10) Patent No.: US 8,392,407 B2  
(45) Date of Patent: Mar. 5, 2013

(54) METHOD, APPARATUS AND SYSTEM OF SEARCHING AND DOWNLOADING MOBILE TELEPHONE FILE

(75) Inventors: Qing Huang, Beijing (CN); Yan Zhang, Beijing (CN)

(73) Assignee: China Mobile Communications Corporation, Beijing (CN)

( * ) Notice: Subject to any disclaimer, the term of this patent is extended or adjusted under 35 U.S.C. 154(b) by 625 days.

(21) Appl. No.: 12/529,006

(22) PCT Filed: Feb. 27, 2008

(86) PCT No.: PCT/CN2008/070363  
§ 371 (c)(1),  
(2), (4) Date: Dec. 29, 2009

(87) PCT Pub. No.: WO2008/104131  
PCT Pub. Date: Sep. 4, 2008

(65) Prior Publication Data  
US 2010/0094876 A1    Apr. 15, 2010

(30) Foreign Application Priority Data  
Feb. 28, 2007    (CN) .......................... 2007 1 0064103

(51) Int. Cl.  
*G06F 17/30* (2006.01)
(52) U.S. Cl. ........................................ 707/721; 707/782
(58) Field of Classification Search .................. 707/782, 707/711, 716, 721, 768  
See application file for complete search history.

(56) References Cited

U.S. PATENT DOCUMENTS

| 7,796,616 | B2 * | 9/2010 | Kim ............................. 370/401 |
| 7,882,268 | B1 * | 2/2011 | Broido ......................... 709/245 |
| 2004/0264471 | A1 | 12/2004 | Boulay et al. |
| 2006/0098608 | A1 * | 5/2006 | Joshi ............................. 370/338 |
| 2006/0168318 | A1 * | 7/2006 | Twiss ............................ 709/238 |
| 2006/0173967 | A1 * | 8/2006 | Jennings et al. ............. 709/208 |
| 2006/0200541 | A1 * | 9/2006 | Wikman et al. .............. 709/223 |
| 2008/0250003 | A1 * | 10/2008 | Dettinger et al. ................. 707/4 |

FOREIGN PATENT DOCUMENTS

| CN | 1731396 | 2/2006 |
| CN | 1852099 | 10/2006 |
| KR | 20070009189 | 1/2007 |

OTHER PUBLICATIONS

Gan, Phui-Si "A DNS-based Rapid Service Discovery for Decentralized Peer-to-Peer Networks with Load Balance" Jan. 2006. Department and Graduate Institute of Information and Communication Engineering. Chaoyang University of Technology. 73 pages.*

Ahmed et al. "Distributed Pattern Matching for P2P Systems" Apr. 2006. Network Operations and Management Symposium, 2006. NOMS 2006. 10th IEEE/IFIP. pp. 198-208.*

(Continued)

*Primary Examiner* — James E Richardson  
(74) *Attorney, Agent, or Firm* — Fulbright & Jaworski L.L.P.

(57) ABSTRACT

A method of searching for and downloading a mobile telephone file is disclosed, and in the method, a server in a domain where a mobile terminal is located receives a keyword in a searching request, searches for resources in the mobile communication network, and returns a list of resources searched out to the mobile terminal; the mobile terminal receives data resource information selected by a user according to the list of the resources the mobile terminal sends a request for downloading resources to the server in the domain, and the server sends the resources to the mobile terminal. An apparatus of searching for and downloading a mobile telephone file is provided also, which includes a storage module, a receiving module, a sending module, a query module, and can also include a data base, a communication interface and a statistic module. A system of searching for and downloading a mobile telephone file is provided.

12 Claims, 5 Drawing Sheets

OTHER PUBLICATIONS

Lindemann et al. ("A distributed search service for peer-to-peer file sharing in mobile applications," 2002. Peer-to-Peer Computing, 2002. (P2P 2002). Proceedings. Second International Conference on. pp. 73-80.*

Li et al. "Neighborhood signatures for searching P2P networks," Jul. 2003. Database Engineering and Applications Symposium, 2003. Proceedings. Seventh International. pp. 149-158.*

International Search Report and the Written Opinion issued for PCT/CN2008/070363, dated Jun. 12, 2008, 6 pages.

* cited by examiner

METHOD, APPARATUS AND SYSTEM OF SEARCHING AND DOWNLOADING MOBILE TELEPHONE FILE

FIELD OF THE INVENTION

The present invention relates to a method, apparatus and system for searching for and downloading a mobile User Equipment file, and particularly to a method, apparatus and system enabling a mobile User Equipment (UE) user to search for and download resources among a group of mobile UE users. The invention relates to the field of communication technology.

BACKGROUND OF THE INVENTION

With the progress in mobile communication technologies and the rapid development of mobile data services, increasing service demands are based on a mobile UE. In terms of resource utilization, in addition to downloading files from a wireless network, a user prefers sharing file resources on other online mobile UE and being able to initiatively acquire and download the desired files by searching.

Presently, a mobile UE user may transmit resources in an end-to-end manner. That is, a sender and a receiver of the resources are known to each other and negotiate the transmission of the resources. Furthermore, a party requesting for resources receives the resources from the sender in a passive manner. Currently, various software may be used for providing a free resource sharing mechanism for static PC terminals, and resources may be searched for on line and downloaded transparently among users of online PC terminals, which facilitates providing the sharing of large resources such as video resources. The online resource searching by a mobile UE user is typically used for the downloading of small resources such as ring tones and pictures from the network, and the mobile UE user is not able to implement the searching and downloading of free resources of online mobile UE users similar to that implemented for the static PC terminals. That is, the mobile UE user is not able to share free resources on other online mobile UEs. Upon a demand for downloading resources, the mobile UE user is not able to initiatively search for resources on line and acquire the resources from multiple resource providers rapidly and effectively.

SUMMARY OF THE INVENTION

An object of the present invention is to provide a method, apparatus and system for searching for and downloading a mobile UE file, to enable a mobile UE user to initiatively search for and download resources among a group of mobile UE users.

To this end, an embodiment of the present invention provides a method for searching for and downloading a mobile UE file, applicable to a mobile communication network divided into a plurality of domains, and the method including:

after receiving a keyword contained in a resource searching request from a mobile UE, searching for, by a server within a domain in which the mobile UE is located (which is also referred to as a domain of the mobile UE for short hereinafter), resources within at least one neighboring domain with a preset neighborhood value in a mobile communication network;

if resources are searched out successfully, returning, by the server within the domain of the mobile UE, a list of the resources searched out to the mobile UE, and sending, by the mobile UE, to the server within the domain of the mobile UE a request for downloading the desired resources according to information of a data source selected based on the list of the resources by a user;

if no resource is searched out, determining, whether the current neighborhood value increased by 1 is larger than the maximal neighborhood value; and if the current neighborhood value increased by 1 is not larger than the maximal neighborhood value, searching for resources within a neighboring domain having the current neighborhood value increased by 1.

An embodiment of the present invention further provides an apparatus for searching for and downloading a mobile UE file, and the apparatus includes:

a storage module configured to store the received keyword, information of at least one data source obtained from a query module, a neighborhood value used for the query by the query module and data slices uploaded by the data source;

a receiving module configured to receive a downloading request sent by a mobile UE;

a sending module, which is connected to the storage module, configured to send to the data source, which is a mobile UE, a request for uploading the desired resources;

a database, which is connected to the query module, configured to store registration information and index information of shared resources of all the mobile UEs in the local domain, and record information of the mobile UE initiating a resource searching request and mobile UEs uploading the resources; and a query module configured to query about the information of the data source according to an index of the resources, and select the data sources using the database;

wherein, after the resource searching request is received from the mobile User Equipment, the query module searches for resources in at least one neighboring domain with a preset neighborhood value in the mobile communication network, and if resources are searched out, returns a list of resources searched out to the mobile User Equipment; if no desired resource is searched out, the query module determines whether the current neighborhood value added by 1 exceeds the largest neighborhood value, and if the current neighborhood value added by 1 is no more than the largest neighborhood value, the query module searches for resources within neighboring domains each having the current neighborhood value increased by 1.

In an embodiment of the present invention further provides a system for searching for and downloading a mobile UE file, and the system includes: a mobile UE, a mobile communication network and the apparatus for searching for and downloading a mobile UE file according to the embodiment of the invention described above. The mobile communication network is divided into several domains, each of which includes at least one server, which serves mobile UEs in its domain. The apparatus communicates with the mobile UE through the mobile communication network. Each mobile UE user in the domain of the server registers with the server, and the shared resources of the mobile UE user corresponds to an index in the server. When roaming from the one domain to another domain, the mobile UE updates its registration server. The apparatus for searching for and downloading a mobile UE file may be integrated into the server in the domain.

The present invention enables a mobile UE user to initiatively search for and download shared resources of a group of mobile UEs among these mobile UEs. The shared resources of the mobile UEs may be richer than resources provided by the mobile communication network, and readily meet requirements of users.

The solutions of the invention are described in detail below with reference to the accompanying drawings and embodiments of the invention.

DETAILED DESCRIPTION OF THE EMBODIMENTS

Figure 1:
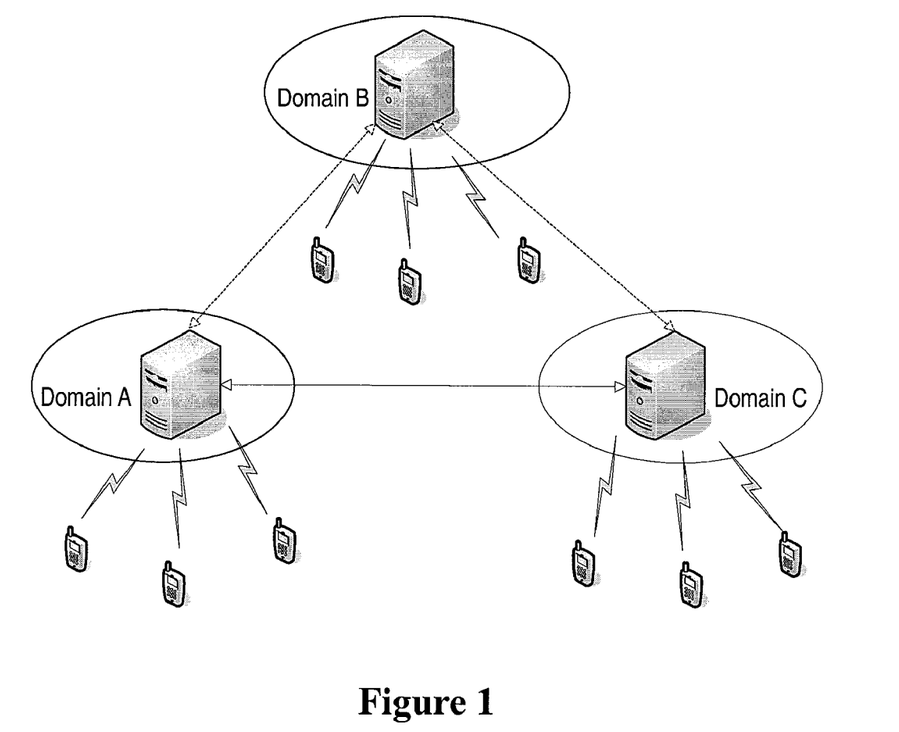
FIG. 1 is a schematic diagram illustrating the structure of a mobile communication network.

As shown in FIG. 1, a mobile communication network may be divided into one or more domains, each of which may be provided with at least one server. For example, two servers may be provided within a domain to serve mobile UEs in the domain, and one of the servers is used to backup all information in the other one of the servers. A method for searching for and downloading a mobile UE file is provided according to a first embodiment of the present invention, and in the method, after receiving a keyword contained in a resource searching request from a mobile UE, a server within a domain in which the mobile UE is located (which is also referred to as a domain of the mobile UE for short hereinafter) searches for resources according to its stored index information of shared resources within the mobile communication network, and if resources are searched out successfully, the server within the domain of the mobile UE returns to the mobile UE a list of the resources searched out, according to which the user subsequently selects a data source to download from, the mobile UE sends to the server within the domain of the mobile UE a request for downloading the desired resources according to the information of the selected data source, and the server sends to the mobile UE the desired resources. If no resource is searched out, the server within the domain of the mobile UE returns information of a failure to the mobile UE.

According to a second embodiment of the invention, the method for searching for and downloading a mobile UE file according to the first embodiment my further include a process in which the mobile UE registers information of shared resources (e.g. files) with the server within the domain of the mobile UE, and the server generates an index of the shared resources according to the information of the shared resources from all the mobile UEs. The process may be carried out before the mobile UE initiates the resource searching request.

When a new file is stored onto the mobile UE, the process above may also be carried out during the searching and downloading. Here, the resource index refers to an index established for resources stored on all the mobile UEs according to index information such as a keyword.

Preferably, in the method according to the first embodiment, the resource searching in the mobile communication network carried out by the server within the domain of the mobile UE particularly may particularly include that: the server performs fuzzy matching of the keyword used for resource searching received from the mobile UE and determines whether a similar search has been carried out in a preset time period; if a similar search has been carried out in the preset time period, the resource searching is carried out within neighboring domains each having a neighborhood value obtained by adding 1 to the neighborhood value used for the similar search; if no similar search has been carried out within the preset time period, resource searching is carried out within neighboring domains each having the smallest neighborhood value; if the desired resources are searched out, the server within the domain of the mobile UE initiating the searching request obtains resource lists of one or more domains, and returns to the mobile UE a list of the optimal resources within the domains; if no desired resource is searched out, the server determines whether the current neighborhood value added by 1 exceeds the largest neighborhood value, and if the current neighborhood value added by 1 exceeds the largest neighborhood value, information of a searching failure is returned to the mobile UE, otherwise the resource searching is carried out within neighboring domains each having the current neighborhood value increased by 1. Information of a searching failure will be returned if no desired resource is searched out finally.

An example of the implementation of the resource searching within the mobile communication network by the server within the domain of the mobile UE is described as follows.

Figure 4:
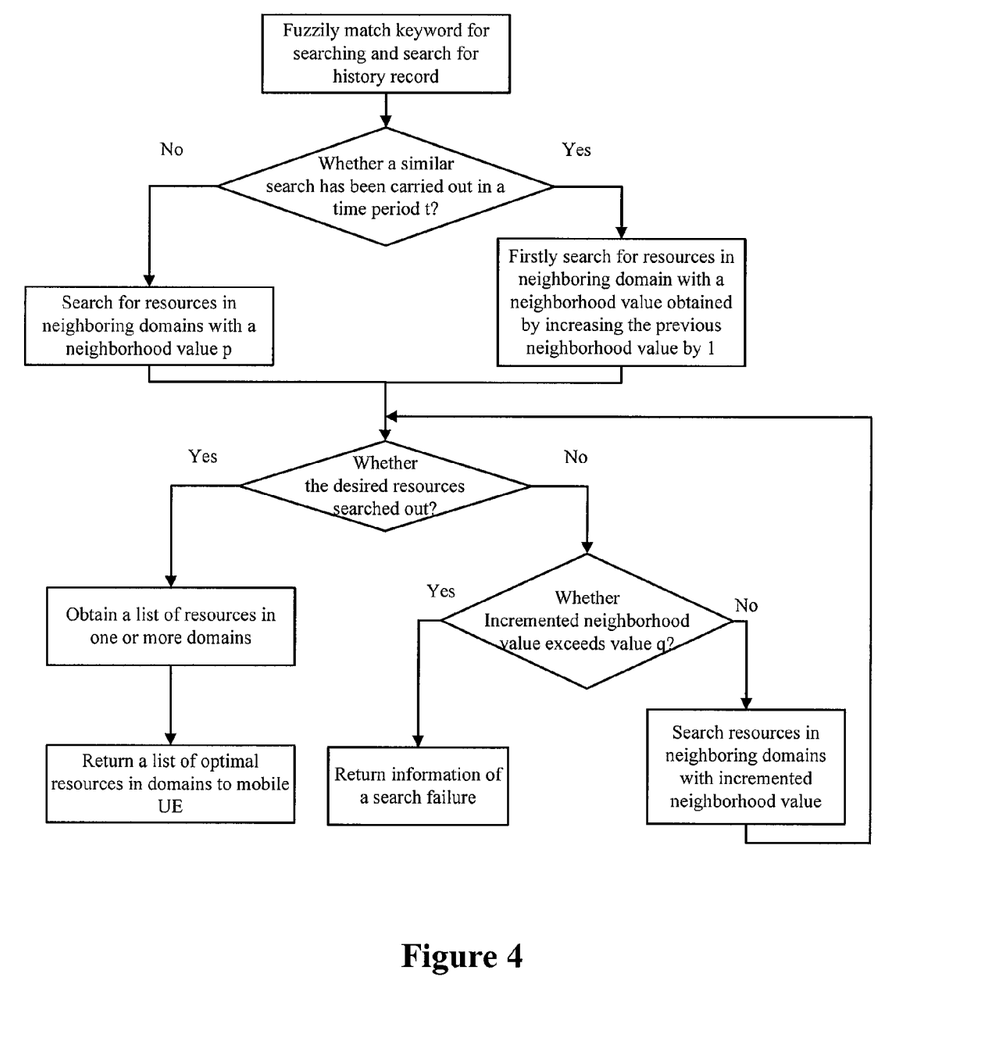
FIG. 4 is a flow chart of searching for resources according to an embodiment of the invention.

As shown in FIG. 4, when a mobile UE initiates a resource searching request on line, the server may generate two values p and q depending on a practical application, where the value p represents the smallest neighborhood value used for the current resource searching, and the value q represents the largest neighborhood value used for the current resource searching. The server performs the fuzzy matching according to user inputs, and determines whether a similar search has been carried out by a user within a past time period t ($t>=0$); if no similar search has been carried out, resource searching is preferably carried out within neighboring domains with a neighborhood value of p ($0<p<q$), and then if no related resource is searched out within the neighboring domains with the neighborhood value of p, the neighborhood value is incremented and the searching is carried out within neighboring domains with the incremented neighborhood value, until the related resources are searched out without the neighborhood value exceeding the value q; if a similar search has been carried out by the user in the past time period t, the resource searching may be carried out within neighboring domains each having a neighborhood value obtained by increasing the neighborhood value used for the previous similar search by 1, and likewise, if no related resource is searched out, the neighborhood value is incremented and the searching is carried out within neighboring domains with the incremented neighborhood value, until the neighborhood value is increased to the value q. For example, the value p is equal to 1 by default, the time period t is 10 minutes, the user has searched for a ring tone called "chrysanthemum station" firstly, the server within the home domain of the user firstly searches for the ring tone "chrysanthemum station" within the local domain (i.e. the domain where the user is located), and for the sake of description, it is assumed that the desired resources are searched out, in this case, the server returns the desired resources to the user; subsequently, within a time period of 10 minutes, the user requests another search for "chrysanthemum station ring tone", and after receiving the request, the server within the home domain may determine that the result of the previous search for "chrysanthemum station" is not what desired by the user, and therefore enlarges the range of searching to search for "chrysanthemum station ring tone" within neighboring domains with a neighborhood value of p; if still no resource is searched out, the neighborhood value of p is incremented and the searching is carried out within neighboring domains with the incremented neighborhood value, until the desired resources are searched out without the neighborhood value exceeding the value q.

In the method according to the first embodiment, the process in which the server within the domain of the mobile UE initiating the searching request sends the desired resources to the mobile UE may further include that: the user selects a data source for downloading from according to the resource list returned by the server in the domain, the mobile UE sends the information of the selected data sources to the server in the domain and sends a resource downloading request to the data source via the server, the selected data source (e.g. a mobile UE) storing the desired resources uploads the desired resources onto a server in the domain where the data source is located, which in turn sends the desired resources to the mobile UE initiating the resource searching request.

Figure 2:
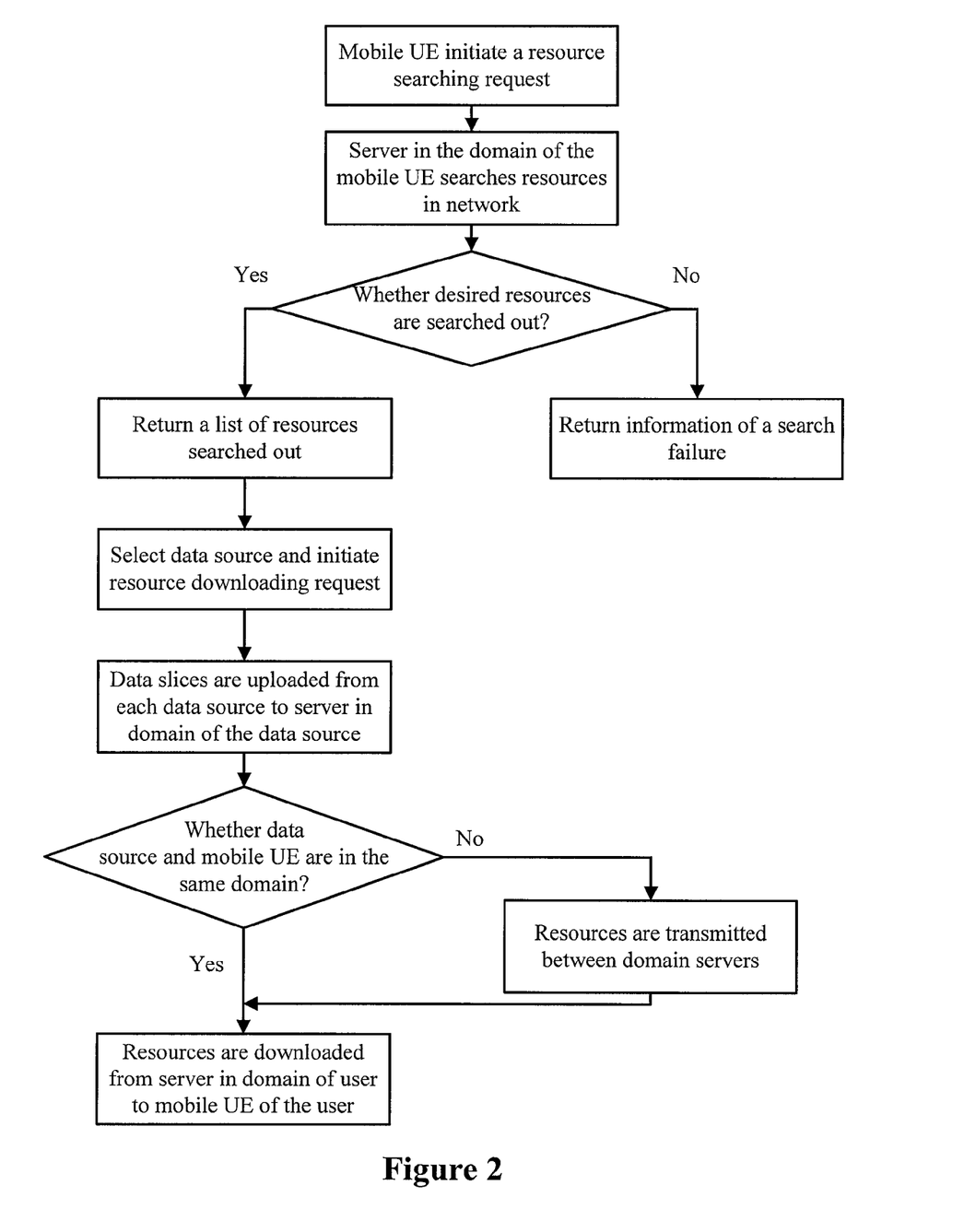
FIG. 2 is a flow chart of acquiring resources by a mobile UE according to an embodiment of the present invention.

As shown in FIG. 2, in the method, in the process in which the selected mobile UE storing the desired resources uploads the resources onto the server in the domain of the selected mobile UE and the server in turn sends the resources to the mobile UE initiating the searching request, if the mobile UE storing the desired resources and the mobile UE initiating the searching and downloading requests are within the same domain, the desired resources are sent from the mobile UE storing the desired resources to the server in the domain of the mobile UE storing the desired resources, and then are sent from the server in the domain to the mobile UE initiating the searching request; and if the mobile UE storing the desired resources and the mobile UE initiating the searching request are within different domains, the mobile UE storing the desired resources sends the desired resources to the server in the domain of the mobile UE storing the desired resources, the server in the domain of the mobile UE storing the desired resources sends the desired resources to the server in the domain of the mobile UE initiating the searching request, and the server in the domain of the mobile UE initiating the searching request sends the desired resources to the mobile UE initiating the searching request.

In the method according to the first embodiment, preferably, at least one data source is selected by the server in the domain of the mobile UE initiating the searching request, data is divided into data slices depending on the number of the searched out data sources, and the selected data sources each upload the designated data slices. The resource overhead used for the downloading of the data may be balanced. Particularly, when multiple data sources are selected, a slice transmission mechanism may be used to obtain resources simultaneously from the multiple data sources, where the number of data slices may depend on the number of suitable data sources searched out. It is possible to define that the number of data slices is not larger than N (N>=1), and if M (M>N) data sources are searched out, N data sources are selected from the M data sources at random for transmitting the data slices, and the selected N data sources upload their designated data slices, which is transparent to both the mobile UE requesting for the resources and the mobile UEs providing the resources. Further, a mechanism of caching the resources in the server may be used to reduce the overhead.

Figure 3:
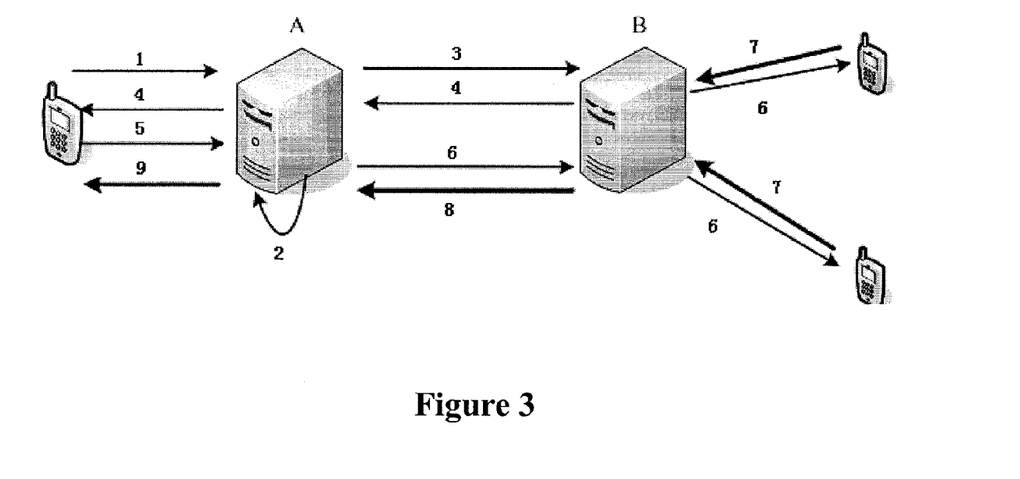
FIG. 3 shows an instance of the flow of acquiring resources by a mobile UE according to an embodiment of the invention.

As shown in FIG. 3, the method includes: process 1, in which a mobile UE initiates a resource searching request to a domain server A in the domain of the mobile UE; process 2, in which the domain server A searches for resources within the local domain but no desired resource is searched out; process 3, in which the domain server A sends a resource searching request to a server B in a neighboring domain according to the method in the fourth embodiment of the invention, so as to search for the desired resources in the neighboring domain, it is assumed that the desired resources are searched out in the neighboring domain where the server B is located in the present embodiment, and process 4 is carried out; process 4, in which the server B in the neighboring domain returns a search result to the mobile UE initiating the resource searching request via the domain server A; process 5, in which a downloading request is sent by the mobile UE; process 6, in which the domain server A sends a data slice uploading request to each of mobile UEs storing the desired resources via the server B in the neighboring domain; process 7, in which the mobile UEs storing the desired resources send the desired resources to the neighboring domain server B; process 8, in which the server B in the neighboring domain sends the desired resources to the domain server A; and process 9: in which the domain server A sends the desired resources to the mobile UE initiating the resource searching request.

Figure 5:
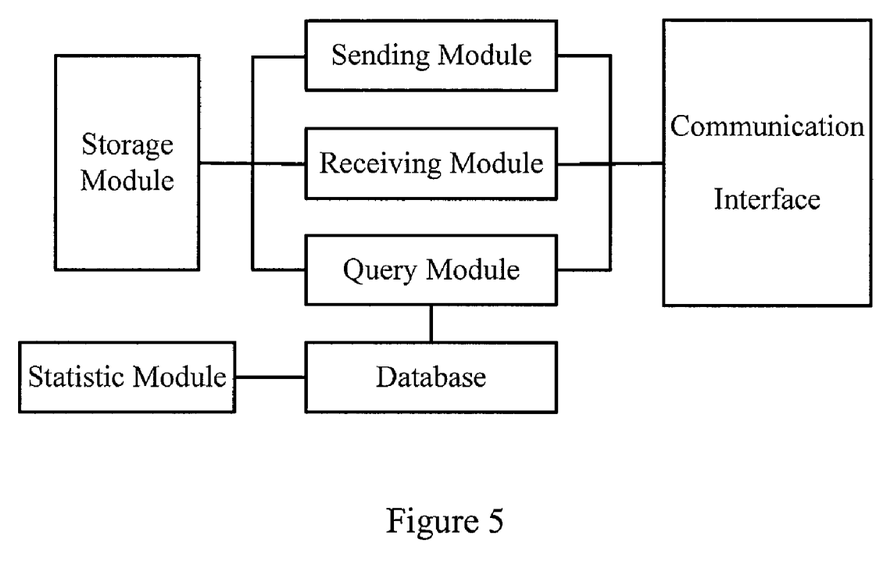
FIG. 5 is a schematic diagram illustrating the structure of an apparatus for searching for and downloading a mobile UE file.

As shown in FIG. 5, an apparatus for searching for and downloading a mobile UE file according to another embodiment of the invention includes: a storage module configured to store the received keyword, information of a data source obtained from a query module, a neighborhood value used for the query by the query module and data slices uploaded by the data source; a receiving module, which is connected to the storage module, configured to receive the keyword for searching and a downloading request sent by the mobile UE, the data slices sent by the mobile UE data sources, and the data slices sent by a server in other domain; a sending module, which is connected to the storage module, configured to send the downloading request and the designated data slices; a database, which is connected to the query module, configured to store registration information and index information of shared resources of all the mobile UEs in the local domain, and record information of a mobile UE initiating the searching request and mobile UEs uploading resources; a query module, connected to the storage module, configured to query about information of data sources according to the index information of the resources and select data sources using the database; a communication interface, which is connected to the query module, the receiving module, and the sending module, configured to enable the communication between the mobile UE and the server in the domain of the mobile UE, as well as between servers in different domains; and a statistic module, which is connected to database, configured to generate bill information and reward information.

When a downloading request initiated by a mobile UE is received by the receiving module, the receiving module sends a keyword for searching to the query module, and the query module determines whether a similar search has been carried out within a time period t (t>=0) according to information stored in the storage module after receiving the keyword, queries about data sources according to a determination result, and stores information of the queried data sources into the storage module. Particularly, if it is determined that a similar search has been carried out in the time period t, the query module may search for resources within neighboring domains each having a neighborhood value obtained by adding 1 to the neighborhood value used for the similar search; if no similar search has been carried out within the time period t, the query module may search for resources within neighboring domains each having the smallest neighborhood value; if the desired resources are searched out, the query module may obtain resource lists of one or more domains, and return to the mobile UE a list of the optimal resources within the domains via the sending module; if no desired resource is searched out, the query module determines whether the current neighborhood value added by 1 exceeds the largest neighborhood value, and if the current neighborhood value added by 1 exceeds the largest neighborhood value, information of a searching failure is returned to the mobile UE, otherwise the query module searches for resources within neighboring domains each having the current neighborhood value increased by 1. Information of a searching failure will be returned if no desired resource is searched out finally. When a data source for downloading from is selected by a user, a downloading request is sent by the mobile UE. After receiving the downloading request, the receiving module stores the information of data sources selected by the user into the storage module, and sends the downloading request to the data source via the sending module.

After receiving the downloading request, the receiving module in the server within the domain where the data source is located selects data sources using the database via the query module, and sends a request for downloading data slices via the sending module. The receiving module receives the data slices sent by the data sources and stores the received data slices into the storage module. If the data source and the mobile UE initiating the downloading request are in the same domain, the data slices are sent to the mobile UE via the sending module; and if the data source and mobile UE are in different domains, the data slices are sent by the sending module to a server in the domain of the mobile UE, and then sent to the mobile UE initiating the downloading request by the server in the domain of the mobile UE.

An embodiment of the invention provides a system for searching for and downloading a mobile UE file, and the system includes a mobile communication network and a mobile UE such as the above-described apparatus for searching for and downloading a mobile UE file. The mobile communication network is divided into several domains, each of which includes at least one server. Each of the shared resources of the mobile UE corresponds to an index in the server, and the mobile UE registers information of its shared resources with the server in the domain of the mobile UE. When moving from the original domain to another domain, the mobile UE cancel the registration with the server in the original domain and register with a server in the new domain. The apparatus for searching for and downloading a mobile UE file may be integrated into the server in the domain.

It will be appreciated that the embodiments of the invention described above are merely intended to illustrate the invention, instead of limiting the invention. While the invention has been described in detail in combination of the preferable embodiments, it will be appreciated by those skilled in the art that make various modifications and alterations may be made to the solutions of invention without departing from the scope of the invention.

The invention claimed is:

1. A method for searching for and downloading a mobile User Equipment file, applicable to a mobile communication network divided into a plurality of domains, comprising:
   after receiving a resource searching request from a mobile User Equipment, searching for, by a server in a domain where the mobile User Equipment is located, resources according to an index of shared resources in at least one neighboring domain with a preset neighborhood value in the mobile communication network, wherein the searching for resources by the server comprises: fuzzily matching, by the server, a keyword in the resource searching request with the index of the shared resources, if a search for the resources according to a similar keyword has been carried out within a preset time period, searching for resources within a neighboring domain having a neighborhood value obtained by increasing a neighborhood value of the search for the resources according to the similar keyword by 1; and if no search for the resources according to the similar keyword has been carried out within the preset time period, searching for resources within a neighboring domain having a minimal neighborhood value;
   if the resources are searched out, returning, by the server, returning a list of resources searched out to the mobile User Equipment;
   initiating, by the mobile User Equipment, a request for downloading desired resources to the server according to the list of resources; and
   if no resource is searched out, determining whether a current neighborhood value increased by 1 is larger than a maximal neighborhood value; and if the current neighborhood value increased by 1 is not larger than the maximal neighborhood value, searching for resources within a neighboring domain having the current neighborhood value increased by 1.

2. The method of claim 1, further comprising:
   sending, by the server, the desired resources to the mobile User Equipment.

3. The method of claim 2, wherein sending the desired resources to the mobile User Equipment by the server comprises:
   selecting, by the server, at least one data source from the mobile communication network according to information of the at least one data source in a downloading request sent by the mobile User Equipment; and
   uploading, by the selected at least one data source in which the desired resources are stored, the desired resources to the server in the domain where the selected at least one data source is located, and sending, by the server where the selected at least one data source is located, the desired resources to the mobile User Equipment initiating the resource searching request.

4. The method of claim 3, wherein if the at least one data source storing the desired resources and the mobile User Equipment initiating the resource searching request are within a same domain, the server in the same domain sends the desired resources to the mobile User Equipment initiating the resource searching request; and
   if the selected at least one data source storing the desired resources and the mobile User Equipment initiating the resource searching request are within different domains, the desired resources are forwarded from the server in the domain of the selected at least one data source to the server in the domain of the mobile User Equipment initiating the resource searching request, and then sent to the mobile User Equipment initiating the resource searching request.

5. The method of claim 3, further comprising, after selecting the at least one data source:
   dividing the resources into data slices according to a number of the at least one data source.

6. The method of claim 1, further comprising, before searching for the resources by the server:
   registering, by the mobile User Equipment, information of shared resources with the server in a domain where the mobile User Equipment is located; and
   generating, by the server, the index of the shared resources according to the information of shared resources of all the mobile User Equipments.

7. An apparatus for searching for and downloading a mobile User Equipment file, comprising:

a storage module configured to store a received keyword, information of at least one data source obtained from a query module, a neighborhood value used for a query by the query module and data slices uploaded by the at least one data source;

a computer processor, said computer processor comprising a receiving module configured to receive a downloading request sent by a requesting mobile User Equipment;

a sending module, which is connected to the storage module, configured to send to the at least one data source, which is another mobile User Equipment, a request for uploading desired resources;

a database, which is connected to the query module, configured to store registration information and index information of shared resources of all mobile User Equipments in a local domain, and record information of the requesting mobile User Equipment initiating a resource searching request and the mobile User Equipments uploading the shared resources; and the query module configured to query about the information of the at least one data source according to an index of the shared resources, and select data sources using the database, and wherein, after the resource searching request is received from the requesting mobile User Equipment, the query module searches for resources in at least one neighboring domain with a preset neighborhood value in a mobile communication network, wherein the query module searches for resources comprises: fuzzily matching a keyword in the resource searching request with the index of the shared resources, if a search for the resources according to a similar keyword has been carried out within a preset time period, searching for resources within a neighboring domain having a neighborhood value obtained by increasing a neighborhood value of the search for the resources according to the similar keyword by 1, and if no search for the resources according to the similar keyword has been carried out within the preset time period, searching for resources within a neighboring domain having a minimal neighborhood value;

if the desired resources are searched out, the query module returns a list of resources searched out to the requesting mobile User Equipment; and if no desired resource is searched out, the query module determines whether a current neighborhood value added by 1 exceeds a largest neighborhood value, and if the current neighborhood value added by 1 is no more than the largest neighborhood value, the query module searches for the requested resources within neighboring domains each having the current neighborhood value increased by 1.

8. The apparatus of claim 7, wherein:
the receiving module is further configured to receive data slices sent by the at least one data source, and additional data slices sent by a server in another domain; and
the sending module is further configured to send designated data slices to the at least one data source.

9. The apparatus of claim 7, further comprising:
a communication interface, which is connected to the query module, the receiving module, and the sending module, configured to enable communication between the mobile User Equipment and the server in the domain of the mobile User Equipment, and between servers in different domains.

10. A system for searching for and downloading a mobile User Equipment file, comprising: a mobile User Equipment, a mobile communication network and an apparatus for searching for and downloading a mobile User Equipment file, wherein the mobile communication network is divided into a plurality of domains, each of which includes at least one server, and the apparatus communicates with the mobile User Equipment over the mobile communication network;

the apparatus comprises:

a storage module configured to store a received keyword, information of at least one data source obtained from a query module, a neighborhood value used for a query by the query module and data slices uploaded by the at least one data source;

a computer processor, said computer processor comprising a receiving module configured to receive a downloading request sent by a requesting mobile User Equipment;

a sending module, which is connected to the storage module, configured to send to the at least one data source, which is another mobile User Equipment, a request for uploading desired resources;

a database, which is connected to the query module, configured to store registration information and index information of shared resources of all mobile User Equipments in a local domain, and record information of the requesting mobile User Equipment initiating a resource searching request and the mobile User Equipments uploading the shared resources; and the query module configured to query about the information of the at least one data source according to an index of the shared resources, and select data sources using the database, and wherein, after the resource searching request is received from the requesting mobile User Equipment, the query module searches for resources in at least one neighboring domain with a preset neighborhood value in a mobile communication network, wherein the query module searches for resources comprises: fuzzily matching a keyword in the resource searching request with the index of the shared resources, if a search for the resources according to a similar keyword has been carried out within a preset time period, searching for resources within a neighboring domain having a neighborhood value obtained by increasing a neighborhood value of the search for the resources according to the similar keyword by 1, and if no search for the resources according to the similar keyword has been carried out within the preset time period, searching for resources within a neighboring domain having a minimal neighborhood value;

if the desired resources are searched out, the query module returns a list of resources searched out to the requesting mobile User Equipment, and if no desired resource is searched out, the query module determines whether a current neighborhood value added by 1 exceeds a largest neighborhood value, and if the current neighborhood value added by 1 is no more than the largest neighborhood value, the query module searches for the required resources within neighboring domains each having the current neighborhood value increased by 1.

11. The system of claim 10, wherein the apparatus is incorporated into a server within one of the domains of the mobile communication networks.

12. The system of claim 10, wherein:

the receiving module of the apparatus is further configured to receive data slices sent by the at least one data source, and additional data slices sent by a server in another domain; and the sending module of the apparatus is further configured to send designated data slices to the at least one data source.

* * * * *